(12) United States Patent
Clemens et al.

(10) Patent No.: US 10,584,998 B2
(45) Date of Patent: Mar. 10, 2020

(54) LIGHT RECEIVER HAVING A PLURALITY OF AVALANCHE PHOTODIODE ELEMENTS AND METHOD FOR SUPPLYING A BIAS VOLTAGE

(71) Applicant: SICK AG, Waldkirch (DE)

(72) Inventors: Klaus Clemens, Waldkirch (DE); Gottfried Hug, Waldkirch (DE); Stefan Seitz, Waldkirch (DE); Sebastian Tschuch, Waldkirch (DE)

(73) Assignee: SICK AG, Waldkirch (DE)

( * ) Notice: Subject to any disclaimer, the term of this patent is extended or adjusted under 35 U.S.C. 154(b) by 138 days.

(21) Appl. No.: 15/850,385

(22) Filed: Dec. 21, 2017

(65) Prior Publication Data

US 2018/0180473 A1 Jun. 28, 2018

(30) Foreign Application Priority Data

Dec. 22, 2016 (EP) .................................... 16206061

(51) Int. Cl.
*G01J 1/44* (2006.01)
*G01S 7/497* (2006.01)
(Continued)

(52) U.S. Cl.
CPC . *G01J 1/44* (2013.01); *G01J 1/46* (2013.01); *G01S 7/4863* (2013.01); *G01S 7/497* (2013.01);
(Continued)

(58) Field of Classification Search
CPC ........ G01J 1/44; G01J 1/46; G01J 2001/4406; G01J 2001/448; G01J 2001/4466;
(Continued)

(56) References Cited

U.S. PATENT DOCUMENTS

| 5,532,474 A | * | 7/1996 | Dautet | ............... H03K 17/0416 |
| | | | | 250/214 R |
| 7,518,095 B2 | * | 4/2009 | Forsyth | ..................... G01J 1/44 |
| | | | | 250/214 R |

(Continued)

FOREIGN PATENT DOCUMENTS

DE 202013105389 U1 9/2015
WO 2011117309 A2 9/2011

OTHER PUBLICATIONS

European Search Report dated Jun. 30, 2017 corresponding to application No. 16206061.0-1812.

*Primary Examiner* — Seung C Sohn
(74) *Attorney, Agent, or Firm* — Nath, Goldberg & Meyer; Jerald L. Meyer; Stanley N. Protigal (57) ABSTRACT

A light receiver (22) having a plurality of avalanche photodiode elements (24) each configured to be biased with a bias voltage above a breakdown voltage and thus to be operated in a Geiger mode for triggering a Geiger current upon light reception, the light receiver (22) comprising a plurality of bias voltage terminals (40a-c) providing different bias voltages, wherein the avalanche photodiode elements (24) form a plurality of groups ($42_1$-$42_n$), and wherein the avalanche photodiode elements (24) of a group ($42_1$-$42_n$) are each supplied with a same one of the different bias voltages.

21 Claims, 7 Drawing Sheets

(51) Int. Cl.
  *G01S 7/4863* (2020.01)
  *G01J 1/46* (2006.01)
  *G01S 17/89* (2020.01)
  *G01S 7/481* (2006.01)
  *G01S 17/08* (2006.01)

(52) U.S. Cl.
  CPC . *G01J 2001/4406* (2013.01); *G01J 2001/448* (2013.01); *G01J 2001/4466* (2013.01); *G01S 7/4816* (2013.01); *G01S 17/08* (2013.01); *G01S 17/89* (2013.01)

(58) Field of Classification Search
  CPC ........ G01S 7/497; G01S 7/4863; G01S 17/08; G01S 7/4816; G01S 17/89
  USPC ...................................... 250/214.1
  See application file for complete search history.

(56) References Cited

U.S. PATENT DOCUMENTS

| | | | | |
|---|---|---|---|---|
| 8,355,117 | B2* | 1/2013 | Niclass | G01C 3/08 |
| | | | | 356/3.01 |
| 8,766,164 | B2* | 7/2014 | Sanfilippo | H01L 31/1075 |
| | | | | 250/214.1 |
| 9,997,551 | B2* | 6/2018 | Mandai | H01L 27/14609 |
| 2011/0240865 | A1 | 10/2011 | Frach et al. | |
| 2013/0153754 | A1 | 6/2013 | Drader et al. | |

* cited by examiner

Figure 9

LIGHT RECEIVER HAVING A PLURALITY OF AVALANCHE PHOTODIODE ELEMENTS AND METHOD FOR SUPPLYING A BIAS VOLTAGE

FIELD

The invention relates to a light receiver having a plurality of avalanche photodiode elements and to a method for supplying a plurality of avalanche photodiode elements of a light receiver with a bias voltage.

BACKGROUND

The function of a light receiver is to generate an electrical signal from incident reception light. The detection sensitivity of simple photodiodes is not sufficient in many applications. In an avalanche photodiode (APD), the incident light triggers a controlled avalanche breakdown (avalanche effect). This multiplies the charge carriers generated by incident photons, and a photo current is produced, which is proportional to the light reception level, but significantly larger than in a simple PIN diode. In a so-called Geiger mode, the avalanche photodiode is biased above the breakdown voltage so that even a single charge carrier generated by a single photon can trigger an avalanche, which subsequently recruits all available charge carriers due to the strong field. Hence, the avalanche diode counts individual events like a Geiger counter from which the name is derived. Geiger mode avalanche photodiodes are also called SPAD (Single Photon Avalanche Diode).

The high radiation sensitivity of SPADs is used in a number of applications. These include medical technology like CT, MRI, or blood tests, optical measuring technology like spectroscopy, distance measurement and three-dimensional imaging, radiation detection in nuclear physics, or uses in telescopes for astrophysics.

Geiger APDs or SPADs thus are very fast, highly sensitive photodiodes on a semiconductor basis. One drawback of the high sensitivity is that not only a measurement photon, but also a weak interference event from ambient light, optical cross talk or dark noise may trigger the avalanche breakdown. The interference event contributes to the measurement signal with the same relatively strong signal as the received measurement light and is indistinguishable within the signal. The avalanche diode subsequently is insensitive for a dead time of about 5 to 100 ns and is unavailable for further measurements during that time. It is therefore common to interconnect and statistically evaluate multiple SPADs. Nevertheless, large light power leads to saturation effects in individual pixels or entire regions. In particular when a large dynamic range is to be covered, important information about the reception light may be lost.

The breakdown voltage is the minimal bias voltage necessary for maintaining the desired Geiger mode for a SPAD. Strictly speaking, however, the detection efficiency and the gain are still zero at this limit. Only when the bias voltage exceeds the breakdown voltage are incident photons converted into corresponding Geiger current pulses. In case of ideal photon detection efficiency (PDE) of 100%, each incident photon would trigger a Geiger current pulse. This is not completely possible in practice. However, the PDE can be influenced by the magnitude of the applied bias voltage.

In order to set the operating point of the SPADs and accordingly their triggering sensitivity via a bias voltage provided externally, the anode-side and cathode-side connections of the individual SPAD cells of the light receiver are directly accessed from the outside. Thus, all SPADs are operated with a common bias voltage. Instead of the bias voltage, sometimes only the overvoltage is considered, i.e. the difference between bias voltage and breakdown voltage. The triggering probability increases with the overvoltage. In practice, there is a reasonable upper limit, because the triggering probability saturates at higher overvoltages, while undesired noise components increase disproportionately. The operating point set by means of the overvoltage enables a certain adaptation of the light receiver, but does not account for many situations with greatly varying or temporally fluctuating reception light conditions.

WO 2011/117309 A2 proposes to provide, in addition to the anode and cathode for providing the bias voltage, a third electrode on the SPAD detector, the third electrode being used for a capacitively coupled output of the Geiger current. This is to prevent that the readout is delayed by switching elements of the bias voltage. However, this does not improve the adaption of the light receiver to ambient or application conditions.

SUMMARY

It is therefore an object of the invention to improve the detection in a light receiver.

This object is satisfied by a light receiver having a plurality of avalanche photodiode elements each configured to be biased with a bias voltage above a breakdown voltage and thus to be operated in a Geiger mode for triggering a Geiger current upon light reception, the light receiver comprising a plurality of bias voltage terminals providing different bias voltages, wherein the avalanche photodiode elements form a plurality of groups, and wherein the avalanche photodiode elements of a group are each supplied with a same one of the different bias voltages.

The object is also satisfied by a method for supplying a plurality of avalanche photodiode elements of a light receiver with a bias voltage, wherein at least some of the avalanche photodiode elements are each biased with a bias voltage above a breakdown voltage and are thus operated in a Geiger mode, wherein the avalanche photodiode elements form a plurality of groups, and wherein avalanche photodiode elements of one group are supplied with a different bias voltage than avalanche photodiode elements of another group.

When a bias voltage above the breakdown voltage is applied to the avalanche photodiode elements, they operate in Geiger mode. The invention starts from the basic idea of locally adjusting the bias voltage and thus the detection sensitivity. To this end, a plurality of different bias voltages are available on the light receiver, which are provided externally or by a circuit of the light receiver at bias voltage terminals for the avalanche photodiode elements. The avalanche photodiode elements are subdivided into a plurality of groups, i.e. at least two groups, whose size can be determined as required up to only one single respective avalanche photodiode element. By supplying a group from one respective bias voltage terminal, the associated avalanche photodiode elements are supplied with a same one of the different bias voltages, and therefore the groups have different sensitivity. The numbers of available bias voltages and groups are mutually independent. Multiple groups can be supplied with the same bias voltage, and on the other hand an available bias voltage might not be used at all by any group.

The invention has the advantage that use of the light receiver is much more flexible. This allows a cost reduction due to less variant diversity and larger quantities. The light receiver also is significantly more robust against varying ambient conditions. The locally varying bias voltages have an effect like an adaptable electronic aperture, in analogy to an optical aperture, in that reception regions are electronically masked out, blanked or muted, or in that their signals are attenuated. This simplifies the optics design which has fewer tasks to fulfill, for example by omitting optical apertures or using less complex lenses. It also supports further miniaturization of a sensor in which the light receiver is used, and there is greater freedom in placing components. The light receiver has electronic means, in the form of the electronic aperture and thus local adaption of bias voltages, to cope with a large dynamic range and inhomogeneities of the reception light. Simpler optics also reduces the tolerance chain and increases process reliability. Moreover, an electronic reception adjustment is possible, where the local sensitivity is electronically adapted to the existing conditions after only a coarse mechanical adjustment, for example by placing an electronic aperture around a reception light spot. This requires neither a mechanical or manual device intervention nor mechanical protection against misalignment, not even an accessibility of the device, and is thus easier to automate. Integration of the avalanche photodiode elements on a light receiver, in contrast to discrete avalanche photodiode elements, enables a larger number of arrangements where unused, light-insensitive intermediate regions and assembly tolerances between the discrete components are eliminated.

The avalanche photodiode elements of a group preferably are selectively supplied with one of the different bias voltages. Throughout this specification, preferably or preferred refers to an advantageous, but completely optional feature. The adaptability to specific light conditions or applications is thus flexible. The selection of which group is supplied with what bias voltage is in fact a configuration or reconfiguration and can be done at various times, for example by a selection between predefined modes, at the factory, during setup or dynamically during operation. An application example is attenuation, i.e. reduction in sensitivity or even deactivation by means of a lower bias voltage, for avalanche photodiode elements in a region which otherwise would be saturated due to too much incident light.

A switching element preferably is arranged between the avalanche photodiode elements of at least one group and the bias voltage terminals. The switching element is an example of means for selecting a bias voltage for a group. The switching element preferably is a multiple switch between not only two, but several or all of the available different bias voltages. The switching element may operate based on a code, in particular a binary code, in order to have few switches also for a somewhat larger number of available bias voltages.

At least two of the plurality of bias voltage terminals preferably have an external connection. In particular, all bias voltage terminals may have an external connection. There, different external bias voltages may be provided. External bias voltage connections allow for a very simple circuit concept, where the terminals and the bias voltages are externally available and controllable.

At least one of the bias voltage terminals preferably is internal, wherein at least one voltage adjusting element for generating different bias voltages from one external voltage is provided. The voltage adjustment element adjusts the external bias voltage by a differential voltage, and additional bias voltages are generated with additional voltage adjustment elements or multiple differential voltages. Of course, the external voltage itself can also be used as one of the different bias voltages, in particular by selecting a zero difference voltage. A hybrid with several externally connected bias voltages terminals is also possible, although preferably all bias voltage terminals are internal. Then, only one single external voltage is required to generate and thus internally provide all bias voltages, which leads to significant savings in external circuitry and to space and cost advantages.

The voltage adjusting element preferably is configured for voltage subtraction. Then, preferably, an external voltage is applied to the light receiver which is too high, or corresponds to the highest required bias voltage, in order to provide sufficient reserve for the voltage subtraction. It is particularly simple in terms of circuitry to always compensate by voltage subtraction. However, a positive or additive compensation increasing the external bias voltage for example by means of a charge pump is conceivable as an alternative, provided one accepts the additional costs.

The voltage adjusting element preferably comprises a control for setting the bias voltage to be generated. This control in particular is externally accessible, for example a digital control. Thus, the values of the available different bias voltages are variable, and this can be used to provide suitable sensitivity levels, but also to adjust the sensitivity of the groups of avalanche photodiode elements which are connected to the respective bias voltage. There are thus two possibilities for varying the sensitivity, namely, to which of the different bias voltages a group of avalanche photodiode elements is connected, and the magnitudes of the available bias voltages, and these possibilities can be used alternatively or cumulatively depending on the embodiment.

The avalanche photodiode elements of at least one group preferably are fixedly connected to a respective bias voltage terminal. In particular, all groups are fixedly connected to a bias voltage terminal. This leads to a simplified design of the light receiver, but at the same time the variability is reduced. Adjustments are only possible by decreasing or increasing the bias voltage at the bias voltage terminals.

The groups preferably form a checkerboard pattern, a concentric pattern, or several laterally displaced regions. These are some advantageous examples of a division into more sensitive and more insensitive regions, wherein depending on the embodiment the patterns are generated by hard wiring or dynamic interconnection of suitable groups to a respective same bias voltage. The pattern together with the associated bias levels define the behavior of the electronic aperture, wherein aperture patterns are possible which would be difficult or impossible to achieve with optical elements. A checkerboard pattern is representative of a pattern in which more sensitive and less sensitive avalanche photodiode elements are available in local alternation. This enables a simultaneous measurement with much and little signal, without delay which would emerge from a conventional sweeping or stepping through the sensitivity. A concentric pattern is suitable, for example, for a light spot whose size is distance-dependent, or which shifts into and out of focus during relative object movement. An example for a lateral displacement is the inevitable shift in a biaxial transmission and reception path, which in triangulation methods even is the desired measuring effect. It is also conceivable to use multiple regions for multiple measuring channels, for example a measuring channel and a reference channel, or regions for several transmitters having different properties, in particular wavelengths.

At least one bias voltage terminal preferably provides a bias voltage above the breakdown voltage and at least one bias voltage terminal preferably provides a bias voltage below the breakdown voltage. The Geiger mode can thus be selectively switched on and off. This is practically equivalent to switching on and off the light reception, since the gain factor in the Geiger mode is of the order of $10^6$.

Bias voltage terminals preferably provide different bias voltages above the breakdown voltage. Gain and triggering probability of the avalanche photodiode elements are related to the overvoltage. The effect of an electronic aperture can thus not only be achieved binary, i.e. as a switching off in case the bias voltage is below the breakdown voltage, but there is a gradual reduction corresponding to an aperture which has intermediate levels of attenuation. Preferably, in a hybrid embodiment, the bias voltage terminals provide at least one bias voltage below the breakdown voltage and multiple different overvoltages.

The light receiver preferably provides a plurality of bias voltage terminals having a different positive potential and a plurality of bias voltage terminals having a different negative potential in order to supply avalanche photodiode elements with different bias voltages by connections to a positive potential and a negative potential from both sides. This results in a larger number of different bias voltages by combining different positive and negative potentials. Due to the double control of the avalanche photodiode elements from both sides, the number of necessary connection lines can significantly be reduced while maintaining very high flexibility. The terms positive and negative are relative, as is usual for potentials. Here, the reference is the situation where, as in various other embodiments, the avalanche photodiode elements are supplied with different potentials only from one side, so that the bias voltage is defined relative to ground. With reference to that, the additional variable potential on the other side is negative.

The groups preferably form a matrix arrangement, wherein the bias voltage terminals having a positive potential are connected to a line or a column, and accordingly the bias voltage terminals having a negative potential are connected to a column or a line, respectively. This results in kind of a crossed control of avalanche photodiode elements from both sides. In a matrix arrangement, there may be a very large number of groups, wherein each group forms a pixel of the matrix. Each pixel can individually be supplied with a different bias voltage by line and column control. In particular, it is possible to only operate one group or specific regions of the matrix above the breakdown voltage. Thus, a detection event can be located on the matrix without any special requirements regarding the readout of the light receiver.

The light receiver preferably has at least one temperature sensing element for detecting an operating temperature of the avalanche photodiode elements, and a temperature compensation unit for adjusting the bias voltages in dependence on the detected operating temperature. The breakdown voltage is subject to a temperature dependency which is on the order of 20-30 mV/K and therefore noticeably affects the effects of an applied bias voltage over a typical temperature range. For compensation, the temperature sensing element determines the operating temperature, wherein the measurement is not necessarily done in conventional units such as ° C. or K, but may also be based, for example, on temperature-dependent raw information such as a voltage or a current in the temperature sensing element. The temperature compensation unit adjusts the bias voltages according to the measurement information of the temperature sensing element. This additional modification of the bias voltages is possible with very little effort and ensures that fluctuations over the operating temperature are compensated.

The temperature sensing element is preferably integrated on the light receiver and in particular is generated in a same semiconductor process with the avalanche photodiode elements. This results in very compact and accurate temperature compensation.

Preferably, the temperature sensing element comprises at least one of the avalanche photodiode elements. This directly uses the same temperature dependence for the determination of the operating temperature which subsequently is compensated. An avalanche photodiode element which measures the temperature preferably is blind, which means that at least its signal does not contribute to the measurement signal of the light receiver, but may also mean that such an avalanche photodiode element is optically and possibly also electrically shielded. Otherwise, the activity of the measuring avalanche photodiode element could affect the temperature measurement.

The temperature compensation unit preferably acts on the at least one voltage adjusting element. In the course of the provision of different bias voltages, therefore, the voltage adjustment element takes a further temperature-dependent voltage difference into account. Alternatively, it is conceivable to provide at least one additional voltage adjusting element for the temperature-dependent voltage difference, preferably by voltage subtraction. Preferably, the temperature compensation unit adjusts all bias voltages at a same time on a common path. In this case, one element is sufficient to compensate all bias voltages in dependence on the temperature. In particular, the temperature compensation unit can be arranged opposite the voltage adaption for the different bias voltages, i.e. with the avalanche photodiode element in between.

The light receiver preferably has an active current limiting unit configured to reduce the bias voltages upon a current flowing in the light receiver exceeding a current threshold. As to arrangement and effect of the current limiting unit, the explanations and embodiments regarding temperature compensation apply analogously. In particular, the current limiting unit preferably may reduce all bias voltages at a same time on a common path. The current limiting unit is preferably integrated on the light receiver, protects it from damages and provides a reasonable operating point even during the current limited operation. The temperature compensation unit preferably also acts as the current limiting unit. The current flowing in the light receiver depends on the bias voltage. Thus, there are already means for limiting the current. Due to the double function of the temperature compensation unit also acting as current limiting unit, there are virtually no additional costs. The current threshold may be adapted to the operating temperature, because for lower operating temperatures, the light receiver is able to handle larger currents without being damaged or becoming unreliable by too much activity with subsequent dead times of the avalanche photodiode elements. Since the temperature compensation unit anyway has information about the operating temperature, it can very easily take this into account and adjust the current threshold from which the bias voltage needs to be lowered for limiting the current.

According to another preferred aspect of the invention, there is provided an optoelectronic sensor comprising at least one light receiver, the light receiver having a plurality of avalanche photodiode elements each configured to be biased with a bias voltage above a breakdown voltage and thus to be operated in a Geiger mode for triggering a Geiger current upon light reception, the light receiver comprising a plurality of bias voltage terminals providing different bias voltages, wherein the avalanche photodiode elements form a plurality of groups, and the avalanche photodiode elements of a group are each supplied with a same one of the different bias voltages.

The sensor preferably is configured for measuring distances. The distance can be determined by triangulation, as in a triangulating scanning sensor or a stereo camera. Preferably, the distance is measured with a light time of flight method. In a pulse based method, a light transmitter transmits short light pulses, and the time until reception of a remission or reflection of the light pulse is measured. Alternatively, in a phase method, transmission light is modulated in its amplitude, and a phase shift between transmission light and reception light is measured, wherein the phase shift again is a measure for the light time of flight. The light time of flight method can be used in a one-dimensional ranging sensor, a laser scanner or an image sensor of a 3D camera according to the light time of flight method.

The sensor preferably is configured as a code reader or for data transmission, in particular in a data light barrier capable of transmitting and receiving data via the light path which is monitored for objects blocking the light path. These are examples of applications. There are other examples, including sensor implementing combinations of the example applications.

The inventive method can be modified in a similar manner and shows similar advantages. Further advantageous features are described in the sub claims following the independent claims in an exemplary, but non-limiting manner.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
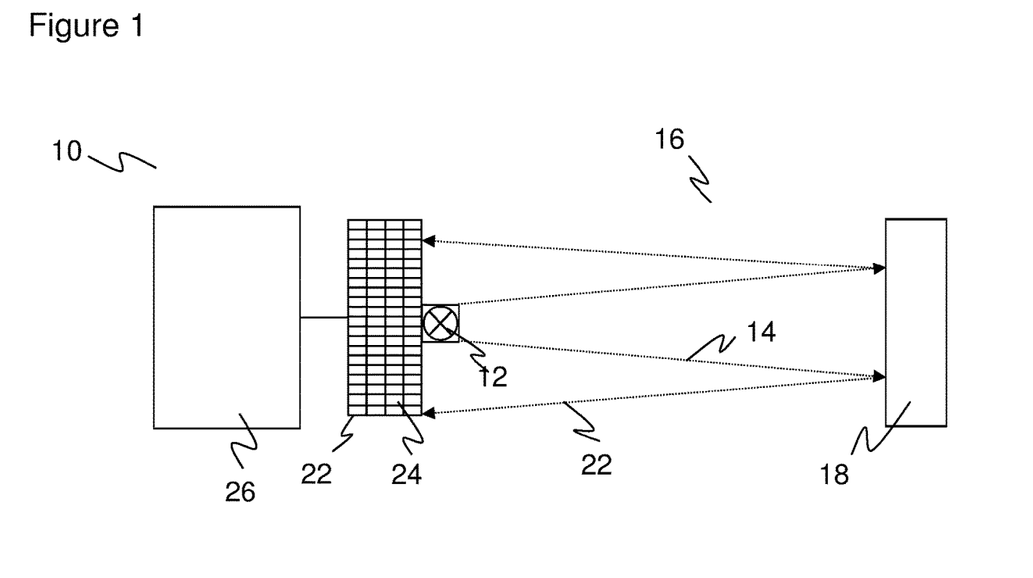
FIG. 1 a schematic representation of an optoelectronic sensor comprising a light receiver having a plurality of avalanche photodiode elements in Geiger mode.

FIG. 1 shows a schematic representation of an optoelectronic sensor 10 in an embodiment as a single-beam or one-dimensional scanning sensor. A light transmitter 12, for example an LED or a laser light source, transmits a light signal 14 into a monitoring region 16. In case it impinges on an object, part of the light signal is remitted or reflected and returns as remitted light signal 20 to a light receiver 22. The light receiver 22 comprises a plurality of avalanche photodiode elements 24 in Geiger mode or SPADs. The reception signals of the avalanche photodiode elements 24 are read out and evaluated by a control and evaluation unit 26.

In a practical embodiment, the sensor 10 has further elements, in particular transmission and reception optics and connections, which are not further explained for simplification. The separation of light receiver 22 and control and evaluation unit 26 in FIG. 1 is also conceivable in practice, but is mainly done for easier explanation. Preferably, these elements are at least partially integrated on a common chip whose area is shared by light-sensitive regions of the avalanche photodiode elements 24 and circuitry for their control and evaluation associated with individual avalanche photodiode elements 24 or groups of avalanche photodiode elements 24. Moreover, the optical arrangement with a light transmitter 12 covering a small part of the light receiver 22 is merely an example. Alternatively, other known optical solutions can be used, such as autocollimation for example with a beam splitter and common optics, or pupil division where two separate optics are provided and light transmitter and light receiver are arranged side by side.

The sensor 10 preferably is configured to measure distances. One possible embodiment is that the control and evaluation unit 26 determines a light time of flight from transmission of the light signal 14 until reception of the remitted light signal 20, and converts this into a distance via the speed of light.

The illustrated one-dimensional sensor 10 is only an example. An extension of the monitoring region 16 is possible by moving the beam, such as in a laser scanner, be it by a rotating mirror or by a rotating measurement head including light transmitter 12 and/or light receiver 22. In another embodiment, multiple one-dimensional systems are combined to form a light grid having multiple, usually parallel beams. In particular, the light grid is a scanning light grid measuring or monitoring distances with its beams. The avalanche photodiode elements 24 can be used individually or in groups for a spatially resolved measurement, thus forming a 3D camera. Moreover, mobile systems are conceivable where the sensor 10 is movably mounted.

Figure 2:
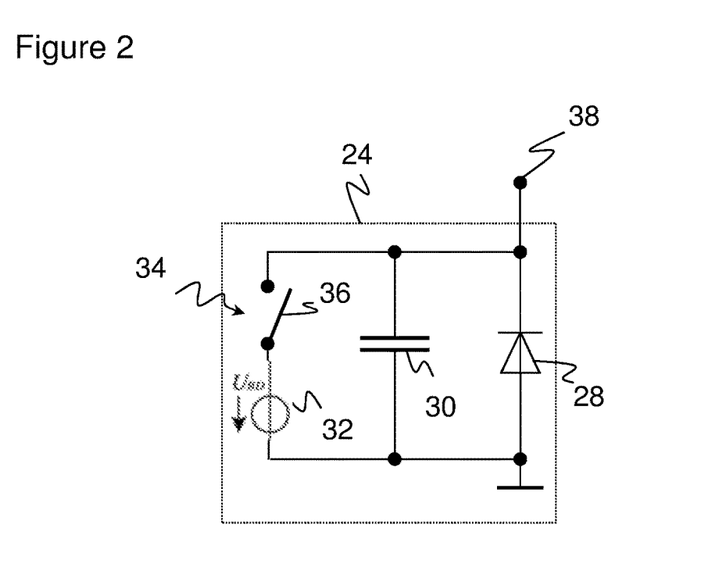
FIG. 2 a simplified block diagram of an avalanche photodiode element in Geiger mode.

FIG. 2 shows an exemplary simplified circuit diagram of one individual avalanche photodiode element 24 in Geiger mode. In practice, this is a semiconductor component whose actual structure is assumed to be known and is not shown. On the one hand, the avalanche photodiode element 24 shows the behavior of a diode 28. It also has a capacitance, which is represented by capacitor 30 in parallel connection. A possible avalanche breakdown generates charge carriers whose origin is shown as a voltage source 32 in the circuit diagram. The avalanche breakdown is triggered by an incident photon 34, which process acts as a switch 36. Subsequently, there are various ways to evaluate the output signal 38 which will not be discussed in detail.

In a ready state, there is a voltage above the breakdown voltage across the diode 28. In case that an incident photon 34 generates a charge carrier pair, this virtually closes the switch 36 so that the avalanche photodiode element 24 is flooded with charge carriers via the voltage source 32. However, new charge carriers are generated only as long as the electric field remains strong enough. Once the capacitor 30 is discharged by the voltage source 32 to such an extent that the voltage is below the breakdown voltage, the avalanche will automatically run out ("passive quenching"). Thereafter, the capacitor 30 is recharged until the voltage across the diode 28 again exceeds the breakdown voltage. There are alternative configurations in which the avalanche is detected from the outside and then a discharge below the breakdown voltage is triggered ("active quenching"). An avalanche photodiode element 24 thus is capable of detecting even single photons and is therefore suitable for a high sensitivity light receiver 22.

The more the bias voltage exceeds the breakdown voltage, the greater the avalanche, because more charge is available on the capacitor 30 before the voltage drops below the breakdown voltage and the avalanche thus is quenched. The bias voltage thus affects the gain. Variations in the bias voltage also affect the quantum efficiency of the avalanche photodiode element 24 because the size of the drift zone that is formed also depends on the magnitude of the bias voltage. This means that the probability of avalanche triggering by a single photon 34 increases with the bias voltage. The bias voltage, or an overvoltage exceeding the breakdown voltage, is therefore a parameter for adjusting the sensitivity of the avalanche photodiode element 24. By lowering the bias voltage below the breakdown voltage, the avalanche photodiode element 24 can be virtually disabled, because the high gain of $10^6$ and more in the Geiger mode is eliminated.

Figure 3:
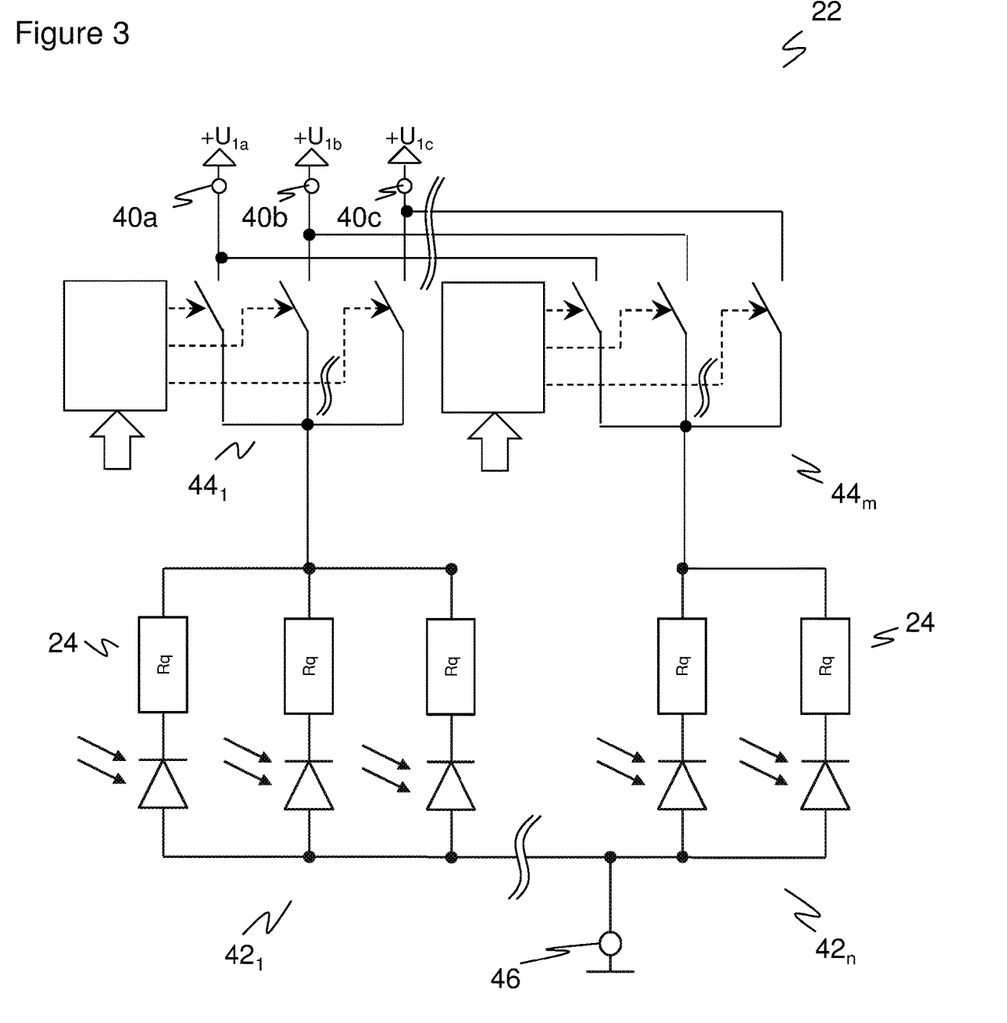
FIG. 3 a schematic circuit diagram of a light receiver supplying avalanche photodiode elements with different bias voltages by switching.

FIG. 3 shows a schematic circuit diagram of the light receiver 22 whose avalanche photodiode elements 24 are biased to different degrees via multiple bias voltage terminals 40a-c, and can thus be adjusted in their sensitivity. The avalanche photodiode elements 24 are each shown in a simplified form as a series connection of a diode and a quench resistor. They are combined in groups, with only two groups $42_1$-$42_n$ being shown, although in practice there can be a large number of groups, up to the limiting case where individual avalanche photodiode elements 24 already form a group. In this context, there is a tradeoff between circuit complexity and flexibility. The specific design of the avalanche photodiode elements 24 is purely exemplary, and every known implementation of SPADs is possible, in particular having active quenching or a third connection as an output with capacitive coupling for reading out the Geiger current according to WO 2011/117309 A2 mentioned in the introduction. The signal detection or readout is not discussed in this specification. It should merely be mentioned that it may be advantageous to combine the signal of multiple avalanche photodiode elements 24 for example of one respective group $42_1$-$42_n$ so that singular events in individual avalanche photodiode elements 24 are compensated by statistics.

The bias voltage terminals 40a-c are part of a circuit which enables to supply the groups $42_1$-$42_n$ with different bias voltages. In this embodiment, the specific selection which of the bias voltage terminals 40a-c is connected to a respective group $42_1$-$42_n$ is done with a 1-to-n-decoder or switching element $44_1$-$44_m$. Thereby, one of the bias voltages of the bias voltage terminals 40a-c is switched to the avalanche photodiode elements 24 of a group $42_1$-$42_n$. A simple multiple switch as a switching element $44_1$-$44_m$ is purely exemplary, and for example a binary or 2n-coded voltage selection is also conceivable for reducing the number of control bits for setting the respective state of the switching elements $44_1$-$44_m$. The selection bits can be stored in memory cells of the light receiver 22, where in a maximum configuration with groups $42_1$-$42_n$ each comprising only one avalanche photodiode element 24 there are individual memory registers per avalanche photodiode element 24 where the bias voltage to be used is stored.

The illustrated number of bias voltage terminals 40a-c and therefore the number of different bias voltages available is also exemplary, as well as the number of groups $42_1$-$42_n$, and results from the specific requirements for the application of the light receiver 22. Usually, however, the number will remain manageable and on an order of magnitude less than ten, in order to limit the circuit complexity and because too fine a gradation of sensitivity will only result in comparatively small advantages, in particular in view of the fact that an avalanche photodiode element 24 can handle at least a certain dynamic range of the reception light on its own even with a fixed bias voltage.

The different bias voltages act like an electronic aperture for switching off certain groups $42_1$-$42_n$ or reducing their sensitivity. As already mentioned, the bias voltage changes the gain and, in particular for red-sensitive avalanche photodiode elements 24, also the quantum efficiency and thus the triggering probability. Consequently, a desired inhomogeneous sensitivity distribution of the light receiver 22 can be set via the different bias voltages. A bias voltage below the breakdown voltage virtually results in a switch-off in the comparably insensitive APD mode or, when the bias voltage is further reduced or zero, even in the PIN mode.

Variation of the overvoltage above the breakdown voltage gradually changes sensitivity, i.e. more or less optical power is required to obtain similar signal levels. Above a certain optical power, there is a saturation effect which results in information loss and a poorer signal-to-noise ratio due to background effects (e.g. dark count). This can be compensated for by different overlapping or non-overlapping sensitivities of other avalanche photodiode elements 24 by means of different bias voltages.

In FIG. 3, the avalanche photodiode elements 24 are connected to the different bias voltage terminals 40a-c from one side, in this case the cathode. On the opposite side, in this case the anode, there is a common terminal 46 having a fixed potential. The mirrored arrangement is also possible, where the different bias voltages are provided at the anode. In embodiments explained below with reference to FIGS. 6 and 7, multiple potentials for setting different bias voltages are available for selection both at the anode and the cathode.

In an alternative embodiment, which is not shown, there are no switching elements $44_1$-$44_m$, but the groups $42_1$-$42_n$ are fixedly connected to one of the bias voltage terminals 40a-c. In this case, there are ultimately only as many groups $42_1$-$42_n$ as there are bias voltage terminals 40a-c, because the assignment to a bias voltage cannot be varied. Hence, in such an embodiment, there are typically only two to five and preferably at most ten groups $42_1$-$42_n$. The geometric arrangement is fixed by design.

Figure 4:
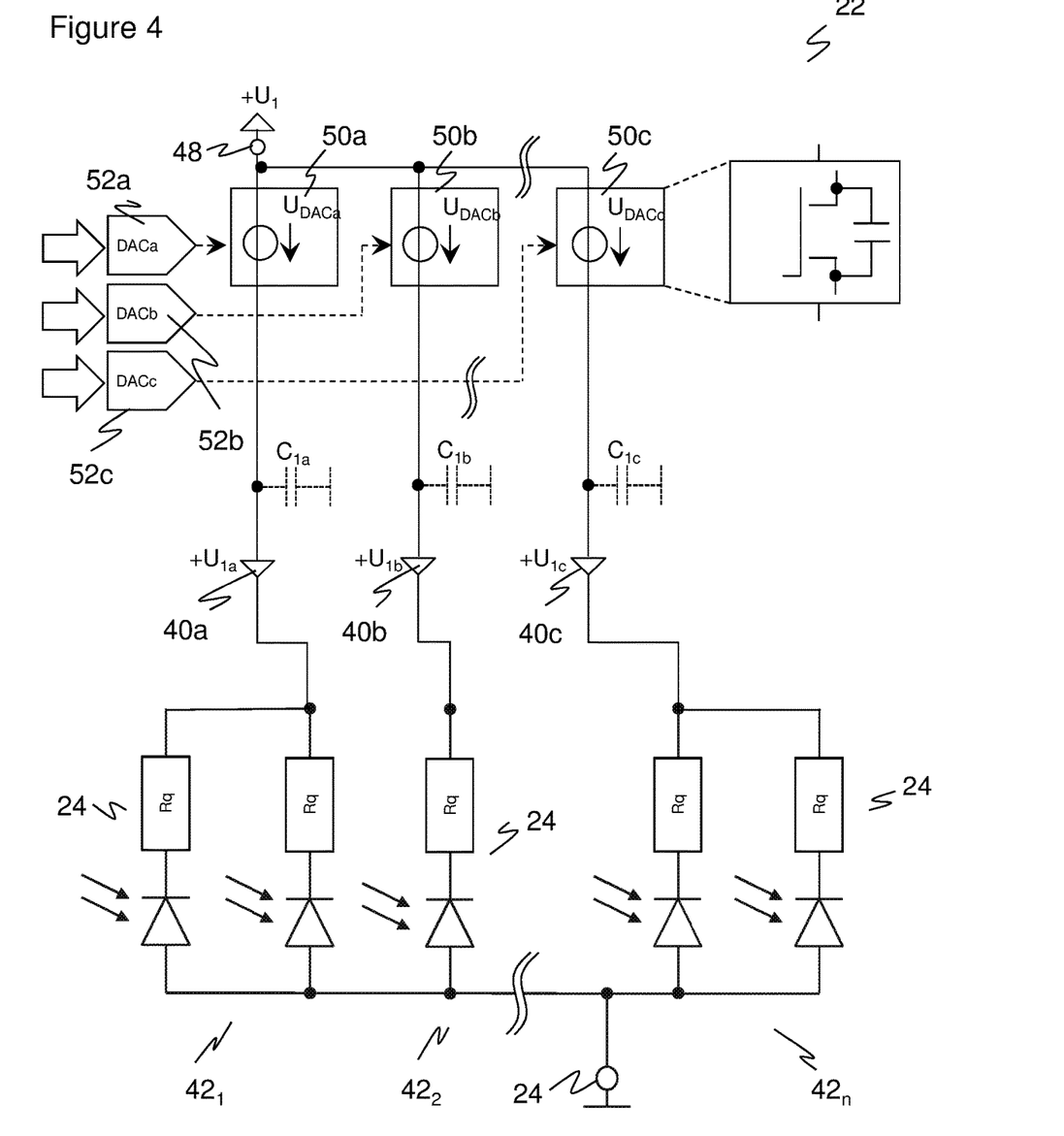
FIG. 4 a schematic circuit diagram of a light receiver supplying avalanche photodiode elements with different bias voltages by voltage subtraction.

FIG. 4 shows a schematic circuit diagram of a further embodiment for the supply of avalanche photodiode elements 24 with different bias voltages. Although the number of different bias voltage terminals 40a-c is typically limited in practice, significant circuitry costs are still necessary to provide the different bias voltages externally. Therefore, in FIG. 4, there is only one single terminal 48 for an external voltage.

Voltage adjustment elements 50a-c generate the required different bias voltages from the one external voltage and provide them at the bias voltage terminals 40a-c, which are now internal. Preferably, the voltage adjustment elements 50a-c use a voltage subtraction, for example similar to the operation of a linear regulator. In that case, the external voltage should correspond to a maximum value for a required bias voltage in order to provide sufficient reserve. In principle, it is also conceivable to add voltage, for example by means of a charge pump.

The voltage adjustment elements $50a$-$c$ comprise a control, in this example in the form of on-chip DA converters $52a$-$c$. It is thus possible to set the bias voltages at the internal bias terminals $40a$-$c$, the voltage gradation being defined by a bit resolution of the DA converters $52a$-$c$ and a difference voltage which is derived linearly or non-linearly. By the resulting bias voltage the sensitivity of the groups $42_1$-$42_n$ is defined in dependence on the overvoltage, or whether they are virtually switched off with a bias voltage below the breakdown voltage. The light receiver $22$ may comprise memory areas for storing the controls. As an alternative to a digital control by means of the DA converters $52a$-$c$, an analog control for example by means of a control current, a control voltage or a resistor circuit is also conceivable. Capacitors $C1a$-$C1c$ shown with dashed lines may be necessary for a low-impedance supply of the avalanche photodiode elements $24$, in particular in case the parallel capacitances of the voltage adjustment elements $50a$-$c$ shown on the upper right side, mostly parasitic capacitances, are not sufficient.

FIG. 4 shows three groups $42_1$-$42_n$ of avalanche photodiode elements $24$ as an example. Since, in this example, the connection to the internal bias voltage terminals $40a$-$c$ is fixed, it may be advantageous not to form more groups $42_1$-$42_n$ than bias voltage terminals $40a$-$c$. On the other hand, there could also be additional groups which differ in other properties although more than one group is fixedly connected to the same bias voltage terminal $40a$-$c$.

Figure 5:
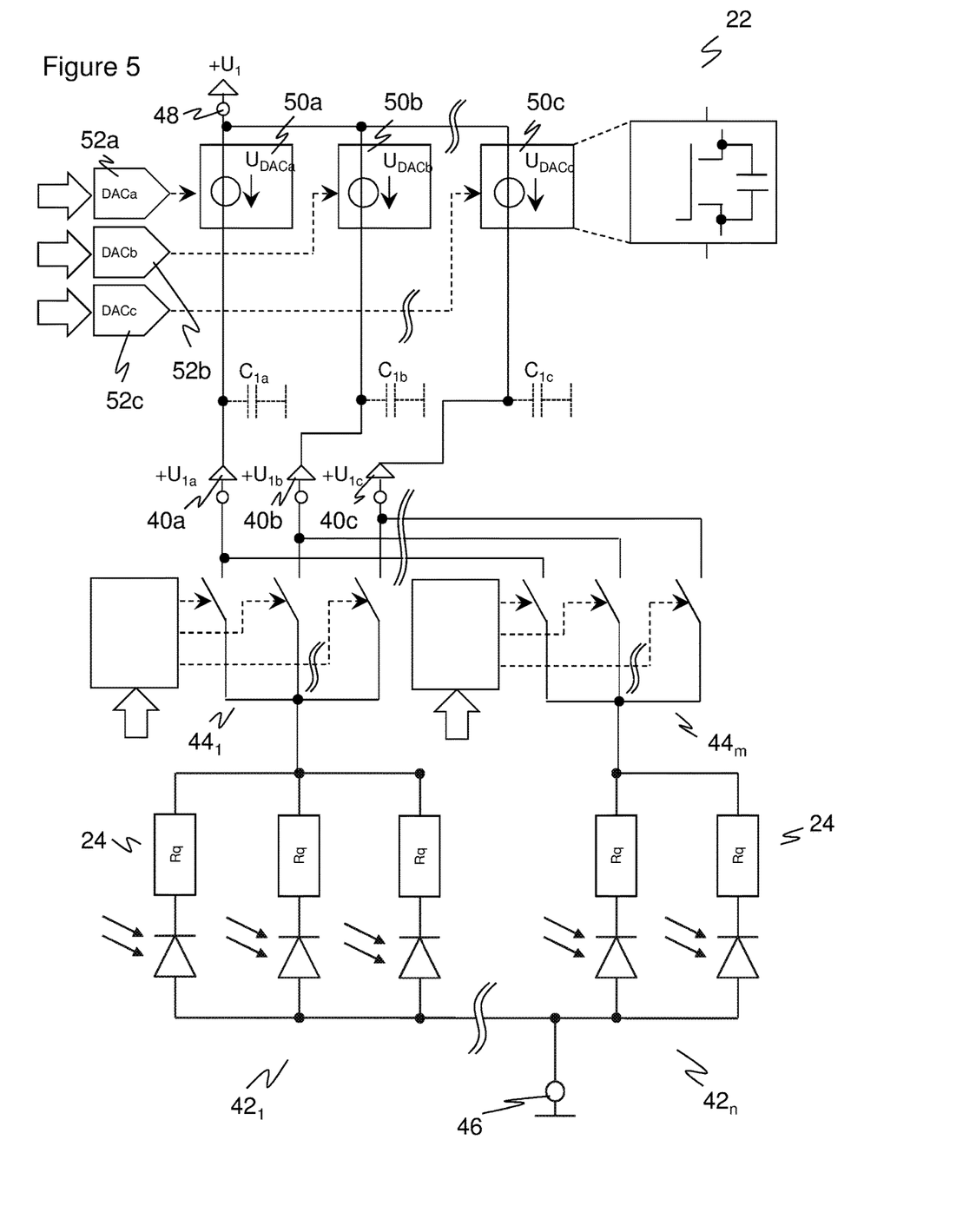
FIG. 5 a schematic circuit diagram of a light receiver supplying avalanche photodiode elements with different bias voltages by switching and voltage subtraction.

FIG. 5 shows a circuit diagram of a further embodiment for supplying avalanche photodiode elements $24$ with different bias voltages. This basically is a combination of the measures which have been explained with reference to FIGS. 3 and 4. Thus, on the one hand, multiple bias voltages are generated from one external voltage at a terminal $48$ by means of voltage adjustment elements $50a$-$c$, and the bias voltages are provided at internal bias voltage terminals $40a$-$c$. On the other hand, switching elements $44_1$-$44_m$ are provided in order to selectively connect the groups $42_1$-$42_n$ to one of the bias voltage terminals $40a$-$c$.

The circuit elements shown in FIGS. 3 to 5 are to be understood purely by way of example, and variants which are mentioned in the context of one Figure can also be used in the other embodiments. The actual implementation of the circuit elements is not fixed or limited, and for example depends on the semiconductor process for producing the light receiver $22$. As already mentioned, the different bias voltages can also be provided at the cathode rather than at the anode as shown. The voltage and reference potentials may be shifted or reversed.

Figure 6:
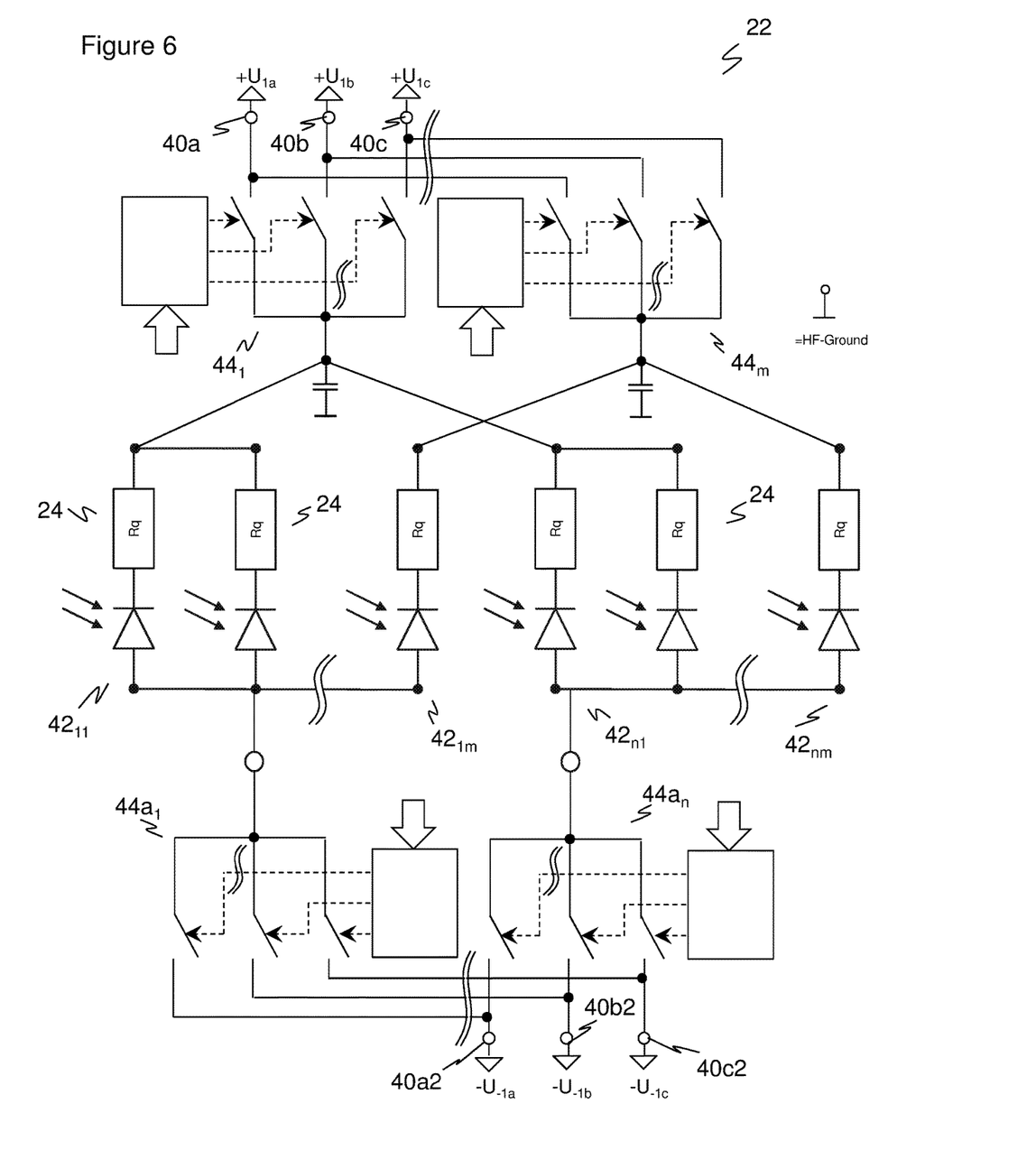
FIG. 6 a schematic circuit diagram of a light receiver whose avalanche photodiode elements are supplied from both sides with different positive and negative potentials, respectively.

FIG. 6 shows a schematic circuit diagram of a further embodiment of the light receiver $22$ in which the avalanche photodiode elements $24$ are supplied with a different positive and negative potential from both sides. The arrangement differs from that according to FIG. 3 mainly by a second block with supply terminals $40a2$-$c2$ and switching elements $44a_1$-$44a_n$ in order to connect the avalanche photodiode elements $24$ to different potentials twice, namely from above and from the bottom, or in more technical terms both at the anode and at the cathode. FIG. 6 shows three positive potentials $+U_{1a} \ldots +U_{1c}$ and three negative potentials $-U_{-1a} \ldots -U_{-1c}$. However, the potentials can freely be selected, neither are they restricted to be inverted with a same absolute value, nor is even the number of different potentials at both sides necessarily the same.

In this embodiment, the avalanche photodiode elements $24$ are arranged to form a nm-matrix where the groups $42_{11}$-$42_{nm}$ can be regarded as pixels of the light receiver $22$. For this arrangement, the double control from both sides is particularly advantageous, but a double control is also possible for any other subdivision into groups $42_1$-$42_n$. Assignments to potentials can vary on both sides, as now described for the example of a matrix arrangement, or also at least partially be the same.

Figure 7:
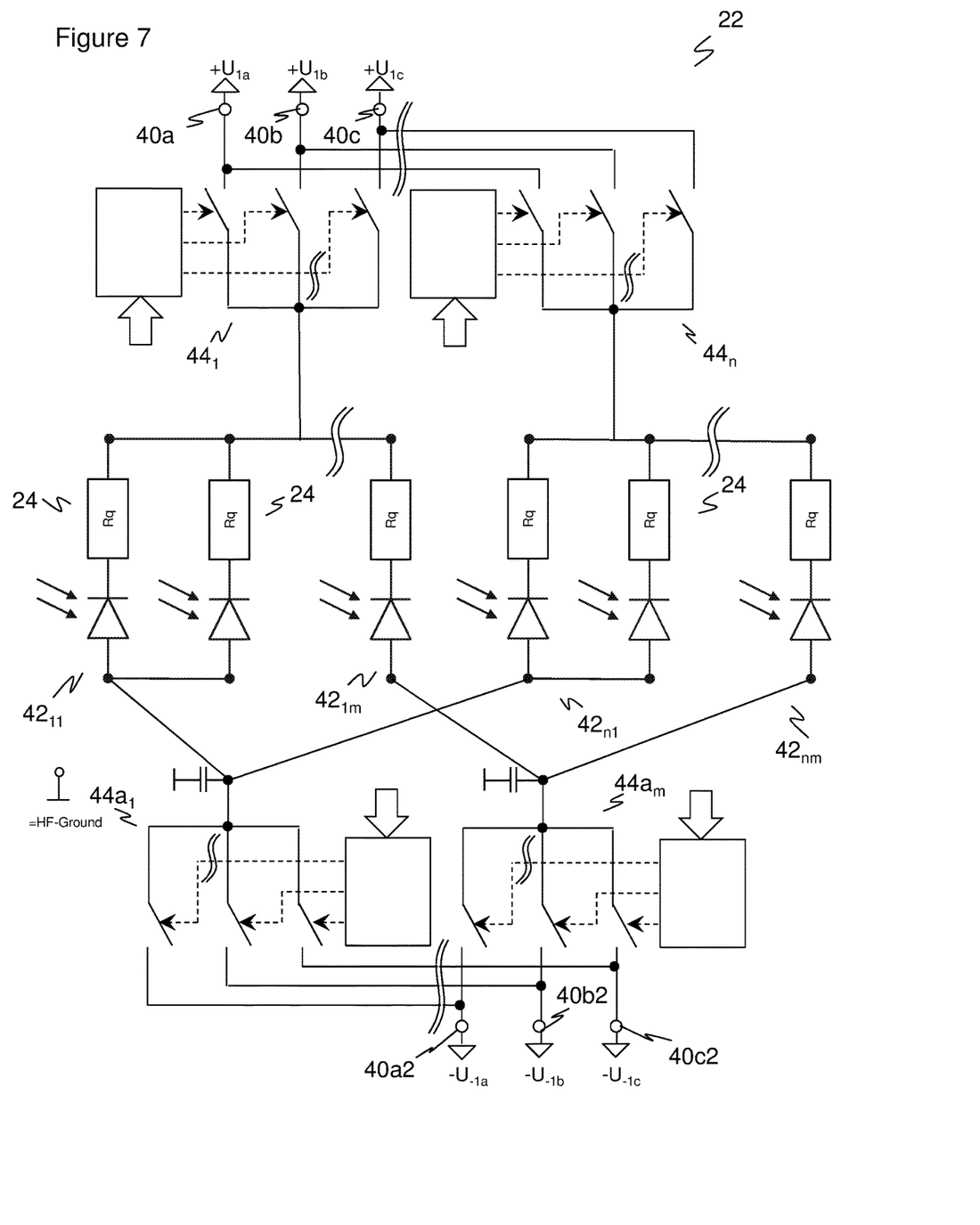
FIG. 7 a schematic circuit diagram similar to FIG. 6, but with interchanged line and column control.

In FIG. 6, in accordance with the matrix arrangement, the respective j-th of the upper switching elements $44_1$-$44_m$ is connected to a column of groups $42_{1j}$-$42_{nj}$ and the respective i-th of the lower switching elements $44a_1$-$44a_n$ is connected to a line of groups $42_{i1}$-$42_{im}$. This is also possible vice versa, i.e. a connection of the upper switching elements $44_1$-$44_m$ with a respective line and of the lower switching elements with a respective column $44a_1$-$44a_n$, and this is illustrated in FIG. 7. The further explanations will refer to FIG. 6 and would be analogous with reference to FIG. 7.

The double control enables to set a column to a selected positive potential $+U_{1a} \ldots +U_{1c}$ and a line to a selected negative potential $U_{-1a} \ldots -U_{-1c}$. As a result, the bias voltage is set for an individual, arbitrarily selectable group $42_{ij}$. This is even possible for multiple groups $42_{ij}$ or pixels and thus selectable regions of the matrix at the same time, although there are certain interdependences due to common lines and columns.

Generally, by the double control, a lot of groups $42_{11}$-$42_{nm}$ or pixels can be supplied with a selected bias voltage, which bias voltage in turn is very variable due to numerous possible combinations of positive and negative potentials. Some examples for modes of operation based thereon will now be explained.

In one mode of operation, only one group $42_{ij}$ is operated above the breakdown voltage to unambiguously locate a detection event. For example, there is a significant difference in the voltage $+U_{1a}$ from $+U_{1b}$, and also in the voltage $-U_{-1a}$ from $-U_{-1b}$. Only in case the maximum positive voltage and the maximum negative voltage are applied at both sides of an avalanche photodiode element $24$ does the bias voltage exceed the breakdown voltage.

In another mode of operation, some groups $42_{11}$-$42_{nm}$ follow a location of a reception light spot, which location is presumed or actually determined. Only groups $42_{11}$-$42_{nm}$ at the location of the reception light spot are operated above the breakdown voltage. One specific embodiment is an electronic adjustment which selects the active groups $42_{11}$-$42_{nm}$ to be operated above the breakdown voltage. This adjusts the electronic aperture to the actual conditions during operation.

Furthermore, the double control allows for a reduction of voltage differences upon switching of the supply voltage used in an avalanche photodiode element $24$. This is advantageous because charging processes with larger voltage differences need more time and thus affect the high-frequency characteristics. Dividing the variable bias voltage into a negative and a positive potential for example allows only the overvoltage to be adjusted at one side of the avalanche photodiode element $24$ in order to vary the gain. To this end, small voltage differences are sufficient. A switching, i.e. a variation of the bias voltage above or below the breakdown voltage with accordingly larger voltage differences, takes place at the opposite side.

Embodiments with a double control have been explained with reference to FIGS. 6 and 7, which is based on FIG. 3. However, provision of positive and negative potentials by means of switching elements $44_1$-$44_m 44a_1$-$44a_n$ is only one example. In particular, the embodiments explained with reference to FIGS. 4 and 5 can also be modified to achieve a double control, i.e. for example by a fixed connection to an external negative voltage, or by voltage adjusting elements which internally generate multiple different negative potentials from one external potential.

Figure 8:
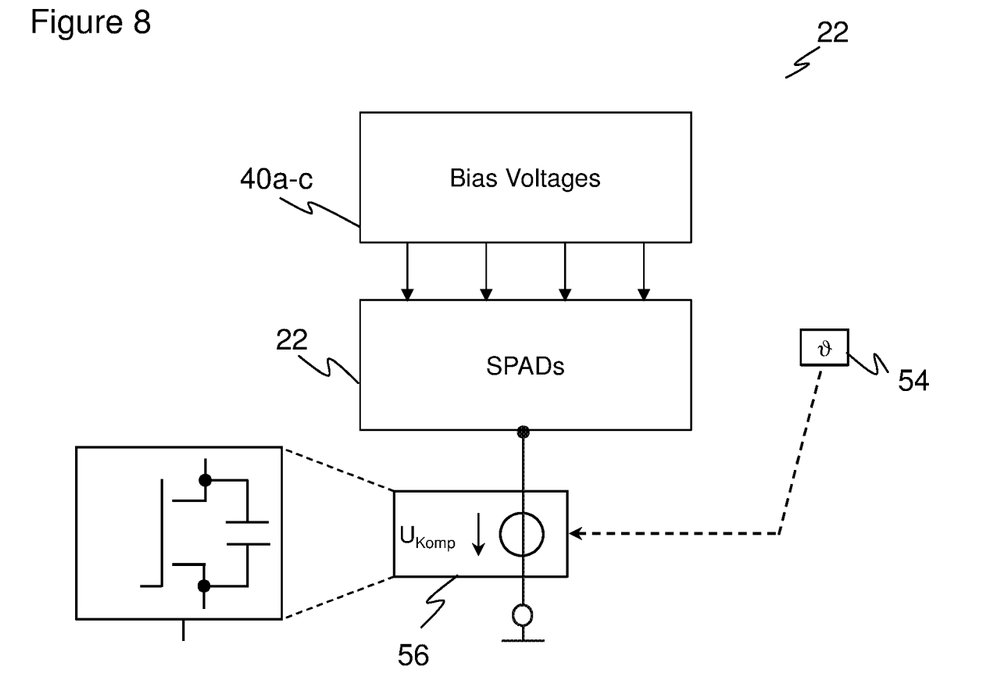
FIG. 8 a block diagram of a light receiver comprising temperature compensation of the bias voltage.

FIG. 8 shows a block diagram of the light receiver 22 for explaining temperature compensation. Only simple blocks are shown for the avalanche photodiode elements 24 and the bias voltage terminals 40a-c. These are representative of all possibilities for supplying photodiode elements 24 with different bias voltages as previously described. FIG. 8 is intended to explain integration of temperature compensation, for which purpose a temperature sensing element or temperature measuring unit 54 is provided which determines the temperature of the light receiver 22. The measured temperature information is used in a temperature compensation unit 56. There is an internal temperature-dependent voltage adjustment, so that bias voltages 40a-c which are provided externally may remain constant even when the temperature varies.

The temperature measuring unit 54 preferably is integrated in the semiconductor process of the light receiver 22. The actual sensing element may be a PN junction on the chip of the light receiver 22, whose temperature coefficient is known, so that voltage variations at the PN junction can be transformed to avalanche photodiode elements 24 based on the temperature coefficient. It is particularly advantageous to use one or more of the avalanche photodiode elements 24 themselves as temperature measuring unit 54, since their temperature dependence and the temperature dependence of the remaining avalanche photodiode elements 24 is the same. A temperature-measuring avalanche photodiode element 24 should preferably be shielded so that the temperature measurement is not affected by activity due to incident light.

The temperature compensation unit 56 converts the temperature-dependent voltage information of the temperature measuring unit 54 into an adjustment of the respective bias voltage. In case that an avalanche photodiode element 24 is used as the temperature measuring unit 54, its voltage value can directly be used. Alternatively, however, modifications are also conceivable, such as amplification or inversion, and also a nonlinear behavior. It is also possible that the temperature measuring unit 54 does not provide any voltage information, but for example a temperature in a conventional unit such as ° C. or K, which is converted in the temperature compensation unit 56.

The temperature compensation unit 56 can be configured for voltage subtraction and in that case operates quite analogously to the voltage adjusting elements 50a-c explained with reference to FIG. 4. Preferably, the temperature compensation unit 56 is arranged at a common path and therefore compensates all different bias voltages by its additional temperature-dependent difference voltage. Alternatively, multiple temperature compensating unit 56 for the respective bias voltages are provided. Another alternative is that the required temperature-dependent difference voltages are additionally taken into account in existing voltage adjustment elements 50a-c when generating the different bias voltages.

As a further modification, the temperature measurement unit 54 may comprise multiple sensing elements distributed on the light receiver 22 to account for local temperature differences. In one embodiment, the temperatures are averaged as a basis for common voltage compensation. Another embodiment compensates different groups $42_1$-$42_n$ in a multi-channel temperature compensation unit 56 in accordance with the local temperature.

Figure 9:
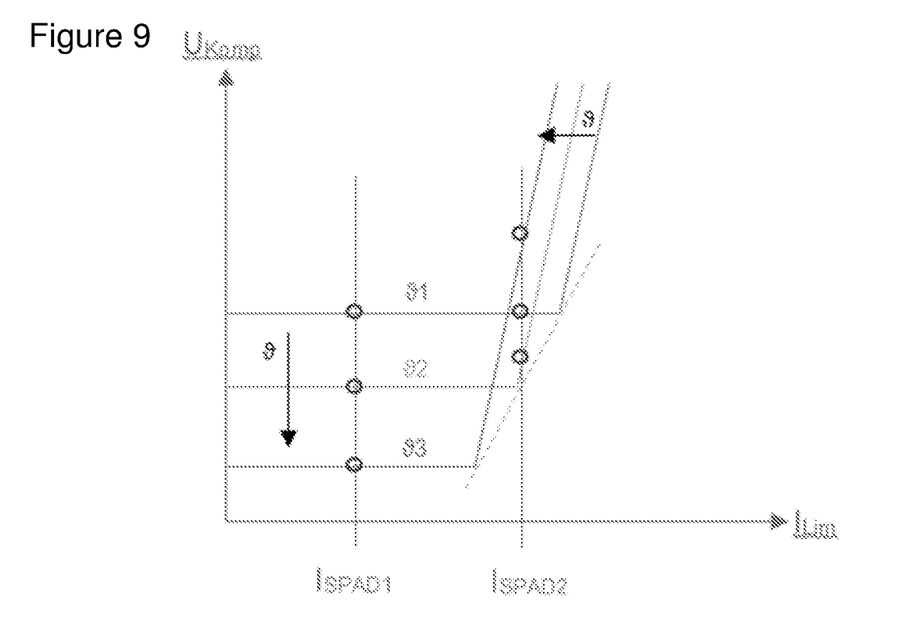
FIG. 9 an exemplary characteristics diagram of the voltage compensation in dependence on current and temperature.

FIG. 9 shows a characteristics diagram of the compensation voltage $U_{Komp}$ required for temperature compensation in dependence on current flow and temperature, in order to further explain possible modes of operation of the temperature compensation unit 56. This in particular relates to an optional additional current limiting mode of the temperature compensation unit 56 which may also be temperature-dependent using the existing temperature measurement unit 54. The current limiting may also be integrated on the light receiver 22 independent of the temperature compensation unit 56 or be implemented externally.

The current limiting is used to protect light receiver 22 against overload. In addition, it ensures that a reasonable operating point still is found in the current limited mode. The activity of the avalanche photodiode elements 24 and thus the current flow depends on light incidence and dark noise, the latter increasing with temperature. It is often not possible to limit the maximum ambient light incidence with opto-mechanic means. With too much light or a high operating temperature, respectively, there is a positive feedback because the increasing power dissipation yet again increases the dark noise. Then, there is the danger of destroying the component.

In addition, if there is too much activity especially of ambient light or dark noise events which do not contribute to the intended detection, a large part of the avalanche photodiode elements 24 is not available for the actual detection due to dead times. A current limiting by reducing the bias voltage or the overvoltage, respectively, ensures that enough avalanche photodiode elements 24 remain available. The current limiting therefore also improves the signal-to-noise ratio. This is also possible with ambient light and a small number of avalanche photodiode elements 24 per area, which usually have the better fill factor and thus a higher sensitivity in the limit level range.

In the characteristics diagram of FIG. 9, the left-hand part corresponds to the temperature compensation of the bias voltage which already has been explained, and the right-hand part corresponds to the current limitation or power dissipation limitation. The transition between these modes forms a kink having a temperature-dependent position. The characteristics diagram is just to illustrate the principles of operation and the interaction of temperature compensation and current limitation. The specific slope of the characteristic curves and the position of the temperature-dependent kinks or transitions are only an example. In particular, the desired current limit values may be variable, for example by external components such as a resistor or by digital means such as a parameter register of the light receiver 22.

The left-hand part of the characteristics diagram corresponding to the compensation mode is discussed at a first value $I_{SPAD1}$ of the current. Here, the current remains below the limiting region for all temperatures. For all operating points, the temperature compensation is done with a typical temperature coefficient or compensation coefficient of about 20-30 mV/K. In accordance with the horizontal characteristic curve of an ideal voltage source, the voltage drop of $U_{Komp}$ is independent from the current and thus the incident light. This is at least almost possible in practice.

On the other hand, slightly increasing characteristic curves are also conceivable. This means that the triggering probability is slightly decreased for larger currents and thus stronger incident light. When the bias voltage is reduced in accordance with the increasing characteristic curve, the triggering probability is reduced. This effect can for example be used to increase the dynamic range. Technically, the slope can be achieved by adding a simple series resistance in the line for the bias voltage $U_{Bias}$ outside the temperature compensation unit 56. The magnitude of the slope is directly dependent on the resistance value which can be selected between two extremes: no series resistance for a horizontal characteristic curve corresponding to an ideal voltage source, and a near-infinite series resistance for a nearly vertical characteristic curve corresponding to an ideal current source. However, a large slope is not really useful, so that actually a low resistance is preferred. In any case, the characteristic curves should be mutually parallel for optimal temperature compensation, so that they everywhere correspond to the temperature gradient of the avalanche photodiode elements 24.

The right-hand part of the characteristics diagram corresponding to the current limiting mode starts at different currents at respective kinks of the characteristic curves depending on the temperature. At a second value $I_{SPAD2}$ of the current, the operating point is in the regular compensation mode only for the lowest temperature $\Sigma1$. For the higher temperatures $\Sigma2$ and $\Sigma3$, the operating points have already been shifted into the current limiting mode.

Within the current limiting mode, the characteristic curves show a steep drop. Staying in the example of $I_{SPAD2}$ and the higher temperatures $\Sigma2$ and $\Sigma53$, the bias voltage is significantly reduced. This reduces the triggering sensitivity of the avalanche photodiode elements 24 and thus the current, assuming otherwise equal conditions and in particular the same light incidence. This effect of the bias voltage on the current applies as long as there is a positive overvoltage. Upon reaching the breakdown voltage, or falling below, there is virtually no current flow any more.

Technically, at least nearly vertical characteristic curves corresponding to an ideal current source would be possible. However, some slope, which can vary in dependence on the design of the light receiver 22, would even be advantageous because an operating point can be found. Otherwise, even the slightest current variation, be it due to light incidence or noise, would lead to enormous variations in the bias voltage. A stable operating point in the limiting region would hardly be possible.

The current limiting as explained is active. This makes it possible to apply an optimal, temperature compensated bias voltage in the compensation mode. Upon exceeding the limit current, which is set in dependence on the temperature, or in other words upon transition into the current limiting mode, the voltage is reduced as a protection against excessive power dissipation, and a dynamic equilibrium is found. In contrast, a passive current limiting for example via a resistance would already cause voltage variations in the normal operating mode with well-tolerated currents. This does no longer optimally achieve the desired stability of the temperature compensation. In addition to the effects on triggering probability and gain, for avalanche photodiode elements 24 having an explicit drift zone for red-sensitivity also a change in spectral sensitivity is possible.

The invention claimed is:

1. A light receiver (22) having a plurality of avalanche photodiode elements (24) each configured to be biased with a bias voltage above a breakdown voltage and thus to be operated in a Geiger mode for triggering a Geiger current upon light reception, the light receiver (22) comprising:
   a plurality of bias voltage terminals (40*a-c*) providing different bias voltages, and having a different positive potential and a plurality of bias voltage terminals (40*a*2*-c*2) having a different negative potential in order to supply avalanche photodiode elements (24) with different bias voltages by connections to a positive potential and a negative potential from both sides,
   wherein the avalanche photodiode elements (24) form a plurality of groups (421-42*n*), and wherein the avalanche photodiode elements (24) of a group (421-42*n*) are each supplied with a same one of the different bias voltages.

2. The light receiver (22) according to claim 1, wherein the avalanche photodiode elements (24) of a group (421-42*n*) are selectively supplied with one of the different bias voltages.

3. The light receiver (22) according to claim 1, wherein a switching element (441-44*m*) is arranged between the avalanche photodiode elements (24) of at least one group (421-42*n*) and the bias voltage terminals (40*a-c*).

4. The light receiver (22) according to claim 1, wherein at least two of the plurality of bias voltage terminals (40*a-c*) have an external connection (48).

5. The light receiver (22) according to claim 1, wherein at least one of the bias voltage terminals (40*a-c*) is internal, and wherein at least one voltage adjusting element (50*a-c*) for generating different bias voltages from one external voltage (48) is provided.

6. The light receiver (22) according to claim 5, wherein the voltage adjusting element (50*a-c*) is configured for voltage subtraction.

7. The light receiver (22) according to claim 5, wherein the voltage adjusting element (50*a-c*) comprises a control (52*a-c*) for setting the bias voltage to be generated.

8. The light receiver (22) according to claim 1, wherein the avalanche photodiode elements (24) of at least one group (421-42*n*) are fixedly connected to a respective bias voltage terminal (40*a-c*).

9. The light receiver (22) according to claim 1, wherein the groups (421-42*n*) form a checkerboard pattern, a concentric pattern, or several laterally displaced regions.

10. The light receiver (22) according to claim 1, wherein at least one bias voltage terminal (40*a-c*) provides a bias voltage above the breakdown voltage and at least one bias voltage terminal (40*a-c*) provides a bias voltage below the breakdown voltage.

11. The light receiver (22) according to claim 1, wherein bias voltage terminals (40*a-c*) provide different bias voltages above the breakdown voltage.

12. The light receiver (22) according to claim 1, wherein the groups (4211-42*nm*) form a matrix arrangement, and wherein the bias voltage terminals (40*a-c*) having a positive potential are connected to a line (42*i*1-42*im*) or a column (421*j*-42*nj*), and accordingly the bias voltage terminals (40*a*2*-c*2) having a negative potential are connected to a column (421*j*-42*nj*) or a line (42*i*1-42*im*).

13. The light receiver (22) according to claim 1, further comprising:
   at least one temperature sensing element (54) for detecting an operating temperature of the avalanche photodiode elements (24); and
   a temperature compensation unit (56) for adjusting the bias voltages in dependence on the detected operating temperature.

14. The light receiver (22) according to claim 13, wherein all bias voltages are adjusted at a same time on a common path.

15. The light receiver (22) according to claim 1, further comprising:

an active current limiting unit (56) configured to reduce the bias voltages upon a current flowing in the light receiver (22) exceeding a current threshold.

16. The light receiver (22) according to claim 15, wherein all bias voltages are reduced at a same time on a common path.

17. An optoelectronic sensor (10) comprising at least one light receiver (22), comprising:

the light receiver (22) having a plurality of avalanche photodiode elements (24) each configured to be biased with a bias voltage above a breakdown voltage and thus to be operated in a Geiger mode for triggering a Geiger current upon light reception, the light receiver (22) comprising a plurality of bias voltage terminals (40a-c) providing different bias voltages, and having a different positive potential and a having a different negative connections to a positive potential and a negative potential from both sides, wherein the avalanche photodiode elements (24) form a plurality of groups (421-42n), and wherein the avalanche photodiode elements (24) of a group (421-42n) are each supplied with a same one of the different bias voltages.

18. The optoelectronic sensor (10) according to claim 17, further comprising:

the sensor (10) being configured as a sensor (10) for measuring distances according to a time of flight method.

19. The optoelectronic sensor (10) according to claim 17, further comprising:

the sensor (10) being configured as a code reader.

20. The optoelectronic sensor (10) according to claim 17, further comprising:

the sensor (10) being configured for data transmission.

21. A method for supplying a plurality of avalanche photodiode elements (24) of a light receiver (22) with a bias voltage, wherein at least some of the avalanche photodiode elements (24) are each biased with a bias voltage above a breakdown voltage and are thus operated in a Geiger mode, wherein the avalanche photodiode elements (24) form a plurality of groups (421-42n), and wherein avalanche photodiode elements (24) of one group (421-42n) are supplied with a different bias voltage than avalanche photodiode elements (24) of another group (421-42n), and a plurality of bias voltage terminals (40a-c), having a different positive potential different bias voltages by connections to a positive potential and a negative potential from both sides.

* * * * *